United States Patent
Pomerantz

(10) Patent No.: US 7,861,287 B2
(45) Date of Patent: Dec. 28, 2010

(54) SYSTEM AND METHOD FOR UTILIZING AUDIT INFORMATION FOR CHALLENGE/RESPONSE DURING A PASSWORD RESET PROCESS

(75) Inventor: Ori Pomerantz, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1260 days.

(21) Appl. No.: 11/435,524

(22) Filed: May 17, 2006

(65) Prior Publication Data

US 2007/0271601 A1 Nov. 22, 2007

(51) Int. Cl.
*H04L 9/32* (2006.01)
*G06F 21/00* (2006.01)

(52) U.S. Cl. .................. 726/6; 726/7; 726/18; 726/19; 713/182

(58) Field of Classification Search ........................ None
See application file for complete search history.

(56) References Cited

U.S. PATENT DOCUMENTS

| | | | |
|---|---|---|---|
| 5,991,882 A * | 11/1999 | O'Connell | 726/18 |
| 6,839,850 B1 | 1/2005 | Campbell et al. | |
| 7,322,048 B2 * | 1/2008 | Nortung | 726/34 |
| 7,383,575 B2 * | 6/2008 | Cheston et al. | 726/16 |
| 7,389,913 B2 * | 6/2008 | Starrs | 235/379 |
| 7,444,672 B2 * | 10/2008 | Ellmore | 726/8 |
| 7,565,326 B2 * | 7/2009 | Randle et al. | 705/65 |
| 7,568,222 B2 * | 7/2009 | Randle et al. | 726/8 |
| 7,574,444 B2 * | 8/2009 | Welingkar et al. | 1/1 |
| 7,603,435 B2 * | 10/2009 | Welingkar et al. | 709/217 |
| 7,624,278 B2 * | 11/2009 | Paden et al. | 713/182 |
| 2005/0027713 A1 | 2/2005 | Cameron et al. | |
| 2005/0102287 A1 | 5/2005 | Poole | |
| 2008/0134317 A1 * | 6/2008 | Boss et al. | 726/18 |
| 2010/0114776 A1 * | 5/2010 | Weller et al. | 705/44 |
| 2010/0122340 A1 * | 5/2010 | Chow et al. | 726/18 |
| 2010/0125906 A1 * | 5/2010 | Golle et al. | 726/18 |
| 2010/0146263 A1 * | 6/2010 | Das et al. | 713/155 |

* cited by examiner

*Primary Examiner*—Christopher A Revak
(74) *Attorney, Agent, or Firm*—Dillon & Yudell LLP

(57) ABSTRACT

A system, method, and computer usable medium for utilizing audit information for challenge/response during a password reset process. In a preferred embodiment of the present invention, a client tracker compiles a log of user actions while a user accesses an account on a data processing system. In response to a user password reset request, the client tracker selects at least one user action from the log of user actions, forms a challenge question based on the selected user action, and in response to an acceptable response to the challenge question, resetting a password associated with the account.

5 Claims, 2 Drawing Sheets

SYSTEM AND METHOD FOR UTILIZING AUDIT INFORMATION FOR CHALLENGE/RESPONSE DURING A PASSWORD RESET PROCESS

BACKGROUND OF THE INVENTION

1. Technical Field

The present invention relates in general to the field of data processing systems. More particularly, the present invention relates to the field of securing data processing systems. Still more particularly, the present invention relates to a system and method for utilizing audit information for challenge/response during a password reset process.

2. Description of the Related Art

Today, many sources of vital information such as bank, e-mail, and on-line bill pay accounts rely on a user entering a username and password to gain access to the accounts. If a user of these types of accounts forget his or her password, it is common to verify the identity of the user utilizing some kind of predetermined challenge/response pair. For example, during account creation, the user may be required to submit and answer to a security question (e.g., mother's maiden name, first pet's name, elementary school name, favorite food, etc.). Utilizing a security question to verify user identity requires users to set up the information in advance, and relies on information an unauthorized user may obtain from other sources.

Therefore, there is a need for a system and method for addressing the aforementioned limitations of the prior art.

SUMMARY OF THE INVENTION

The present invention relates to a system, method, and computer usable medium for utilizing audit information for challenge/response during a password reset process. In a preferred embodiment of the present invention, a client tracker compiles a log of user actions while a user accesses an account on a data processing system. In response to a user password reset request, the client tracker selects at least one user action from the log of user actions, forms a challenge question based on the selected user action, and in response to an acceptable response to the challenge question, resetting a password associated with the account.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1A:
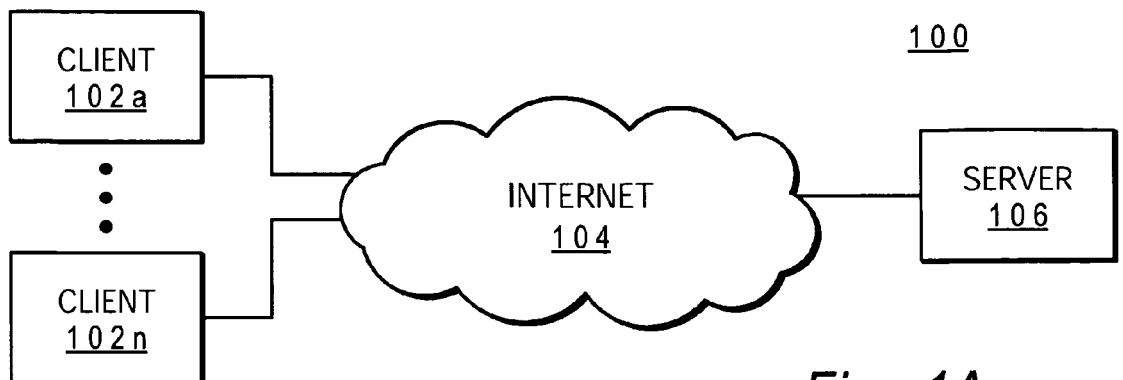
FIG. 1A is a block diagram illustrating an exemplary network in which a preferred embodiment of the present invention may be implemented.

Referring now to the figures and in particular, referring to FIG. 1A, there is illustrated an exemplary network 100 in which a preferred embodiment of the present invention may be implemented. As depicted, network 100 includes clients 102*a-n*, Internet 104, and server 106. Clients 102*a-n* access services on server 106 via Internet 104, which may also be implemented as a local-area network (LAN) or wide-area network (WAN). Both clients 102*a-n* and server 106 are discussed herein in more detail in conjunction with FIGS. 1B and 1C.

Figure 1B:
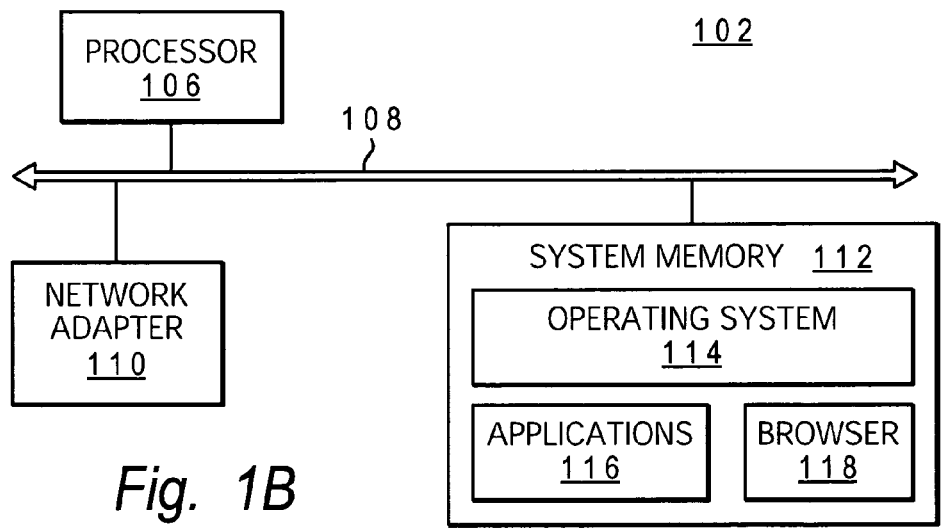
FIG. 1B is a block diagram depicting an exemplary client computer as illustrated in FIG. 1A according to a preferred embodiment of the present invention.

FIG. 1B is a block diagram depicting an exemplary client 102 according to a preferred embodiment of the present invention. As illustrated, client 102 includes processor 106, system interconnect 108, network adapter 110, and system memory 112. Preferably, system memory 112 may be implemented as a collection of dynamic random access memory (DRAM) modules. Network adapter 110 enables client 102 to connect to Internet 104 to access remote computers, such as server 106.

Also, as depicted, system memory 112 includes operating system 114, applications 116, and browser 118. Operating system 114 monitors and facilitates memory management, process and task management, disk management, and mouse and keyboard management. Applications 116 include word processors, spreadsheets, databases, and browser 118, which may be utilized to access remote computers via network adapter 110 and Internet 104.

Those skilled in the art will appreciate that client 102 can include many additional components not specifically illustrated in FIG. 1B. Because sure additional components are not necessary for an understanding of the present invention, they are not illustrated in FIG. 1B or discussed further herein. It should be understood, however, that the enhancements to client 102 to improve account access security provided by the present invention are applicable to data processing systems of any system architecture and are in no way limited to the generalized data processing system architecture illustrated in FIG. 1B.

Figure 1C:
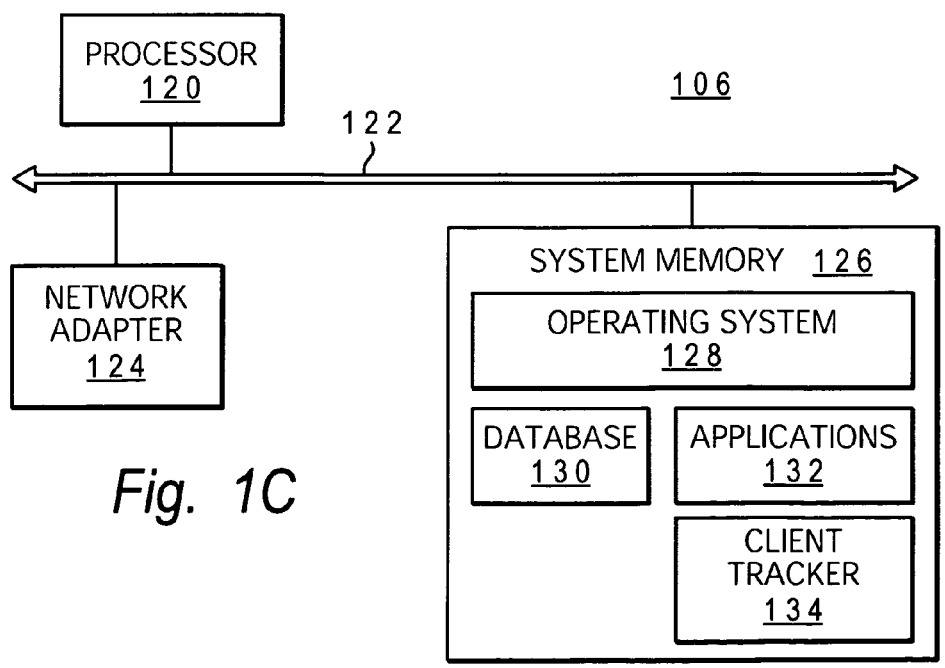
FIG. 1C is a block diagram illustrating an exemplary server computer as depicted in FIG. 1A according to a preferred embodiment of the present invention.

FIG. 1C is a block diagram illustrating an exemplary server 106 according to a preferred embodiment of the present invention. As depicted, server 106 includes processor 120, system interconnect 122, network adapter 124, and system memory 126. Preferably, system memory 126 may be implemented as a collection of dynamic random access memory (DRAM) modules. Network adapter 124 enables server 106 to connect to Internet 104 to enable clients 102*a-n* access to files and application functions stored in system memory 126.

Also, as depicted, system memory 126 includes operating system 128, applications 132, database 130, and client tracker 134. Operating system 128 monitors and facilitates memory management, process and task management, disk management, and mouse and keyboard management. Applications 132 include work processors, database 130, and client tracker 134, discussed herein in more detail in conjunction with FIG. 2.

Those skilled in the art will appreciate that server 106 can include many additional components not specifically illustrated in FIG. 1B. Because sure additional components are not necessary for an understanding of the present invention, they are not illustrated in FIG. 1C or discussed further herein. It should be understood, however, that the enhancements to server 106 to improve account access security provided by the present invention are applicable to data processing systems of any system architecture and are in no way limited to the generalized data processing system architecture illustrated in FIG. 1C.

Figure 2:
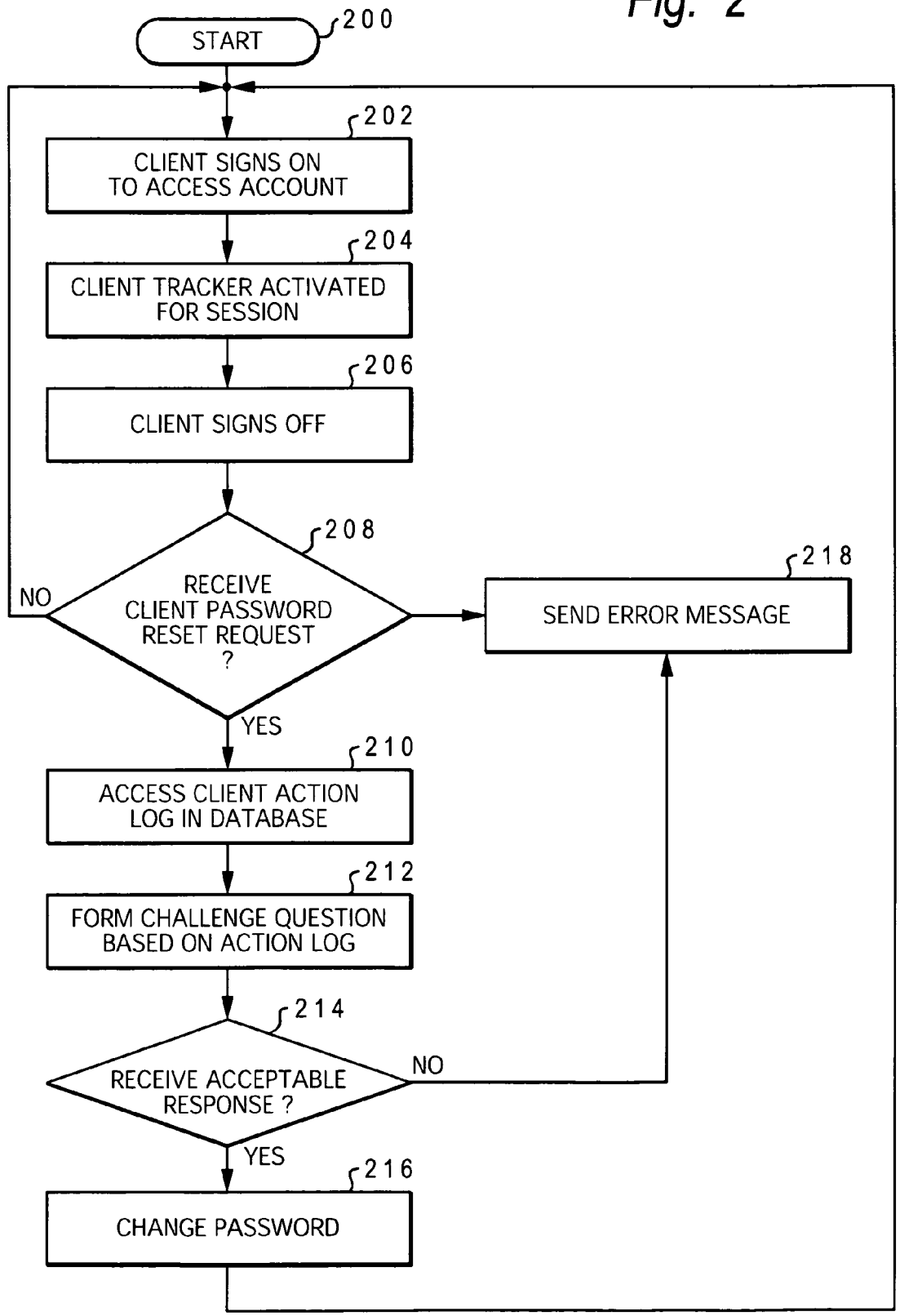
FIG. 2 is a high-level logical flowchart diagram depicting an exemplary method for utilizing audit information for challenge/response during a password reset process according to a preferred embodiment of the present invention.

FIG. 2 is a high-level logical flowchart diagram illustrating an exemplary method for utilizing audit information for challenge/response during a password reset process according to a preferred embodiment of the present invention.

The process begins at step 200 and proceeds to step 202, which illustrates a client (e.g., client 102a) signing on to a previously-created account stored on server 106. The process continues to step 204, which depicts client tracker 134 tracking client 102a's activity during the session. In a preferred embodiment of the present invention, client tracker 134 creates a session log of all of client 102a's actions or input during the session. The session log is stored within database 130. When client 102a signs off of server 106, as illustrated in 206, client tracker 134 completes the session log and stores the session log in database 130.

The process proceeds to step 208, which illustrates client tracker 134 determining if it has received a password reset request from client 102a. Client 102a may request a password reset in the event that the user accessing server 106 via client 102a cannot remember the correct password to access the account stored on server 106. However, to ensure that the user accessing server 106 via client 102a is an authorized user of the account, a preferred embodiment of the present invention is utilized to more accurately and securely uniquely identify an authorized user.

If client tracker 134 has not received a password reset request from client 102a, the process returns to step 202 and proceeds in an iterative fashion. If client tracker 134 as received a password reset request from client 102a, the process continues to step 210, which illustrates client tracker 134 accessing the action log corresponding to client 102a in database 130. Client tracker 134 can then form a challenge question based on the contents of the action log to verify the user's identity, as illustrated in step 212.

In a preferred embodiment of the present invention, a variety of methods may be utilized to form the challenge question. The challenge question may be a query to the user about files handled or actions performed in the last account session. For example, if the user account is an on-line banking account, client tracker 134 may query the user with "What was the dollar amount of your last deposit?" or "What was the dollar amount of your latest utility bill?" If the user account is an employee account, the challenge question may be "What was the last file that you accessed?" These challenge questions, as opposed to a prearranged challenge/response known by those skilled in the art, will result in questions that are more likely to be answered correctly only by an authorized user, thus resulting in more secure user accounts.

The process proceeds to step 214, which illustrates client tracker 134 determining if client 102a has provided an acceptable response. If client 102a has not provided an acceptable response, the process continues to step 218, which illustrates client tracker 134 issuing an error message and alternatively, notifying a system administrator of server 106 of a possible unauthorized access to the user account. The process returns to step 208 and proceeds in an iterative fashion.

If client tracker 134 has received an acceptable response to the challenge question, the process continues to step 216, which illustrates client tracker 134 allowing client 102a to set a new password associated to the user account. The process returns to step 202 and proceeds in an iterative fashion.

As discussed, the present invention includes a system, method, and computer usable medium for utilizing audit information for challenge/response during a password reset process. In a preferred embodiment of the present invention, a client tracker compiles a log of user actions while a user accesses an account on a data processing system. In response to a user password reset request, the client tracker selects at least one user action from the log of user actions, forms a challenge question based on the selected user action, and in response to an acceptable response to the challenge question, resetting a password associated with the account.

It should be understood that at least some aspects of the present invention may alternatively be implemented in a computer-usable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method for resetting a user password, said method comprising:
   in response to a password reset request from a user,
      selecting an user action from a session log configured to record a plurality of user actions when said user was previously signed on to an account stored on a server;
      generating for said user a challenge question based on said selected user action; and
      pending from said user an acceptable response to said challenge question; and
   in response to an acceptable response to said challenge question from said user, resetting a password associated with said account.

2. The method of claim 1, wherein said method further includes
   in response to an unacceptable response to said challenge question, sending an error message to said user.

3. The method of claim 1, wherein said method further includes in response to an unacceptable response to said challenge question, notifying a system administrator of said server.

4. The method of claim 1, wherein said user action is depositing money on a banking account.

5. The method of claim 1, wherein said user action is paying bills online.

* * * * *